United States Patent
Wang et al.

(10) Patent No.: US 12,212,954 B2
(45) Date of Patent: Jan. 28, 2025

(54) SYSTEMS AND METHODS FOR MAINTAINING A SERVICE SESSION IN AN AUTOMOTIVE EDGE COMPUTING ENVIRONMENT

(71) Applicant: Toyota Motor Engineering & Manufacturing North America, Inc., Plano, TX (US)

(72) Inventors: Haoxin Wang, Charlotte, NC (US); BaekGyu Kim, Mountain View, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 537 days.

(21) Appl. No.: 17/412,777

(22) Filed: Aug. 26, 2021

(65) Prior Publication Data
US 2023/0060164 A1 Mar. 2, 2023

(51) Int. Cl.
*H04W 36/00* (2009.01)
*H04W 36/08* (2009.01)
*H04W 36/12* (2009.01)
*H04W 36/30* (2009.01)

(52) U.S. Cl.
CPC .... *H04W 36/0011* (2013.01); *H04W 36/0085* (2018.08); *H04W 36/125* (2018.08); *H04W 36/304* (2023.05)

(58) Field of Classification Search
CPC ......... H04W 36/0011; H04W 36/0085; H04W 36/08; H04W 36/125; H04W 36/30;
(Continued)

(56) References Cited

U.S. PATENT DOCUMENTS

2018/0364669 A1* 12/2018 Bostick ................. G06N 20/00
2019/0208449 A1   7/2019 Wang
(Continued)

OTHER PUBLICATIONS

Park et al. ("A Novel Deep Reinforcement Learning based service migration model for Mobile Edge Computing", Proceedings of the 2020 IEEE/ACM 24th International Symposium on Distributed Simulation and Real Time Applications (DS-RT)) (Year: 2020).*
(Continued)

*Primary Examiner* — Chi H Pham
*Assistant Examiner* — Ji-Hae Yea
(74) *Attorney, Agent, or Firm* — Christopher G. Darrow; Darrow Mustafa PC

(57) ABSTRACT

Systems and methods for maintaining a service session in an automotive edge computing environment are disclosed herein. One embodiment computes a first estimation result pertaining to computation resources of a current edge server with which a vehicle is in communication; computes a second estimation result pertaining to link quality; computes a third estimation result pertaining to service quality; compares the first, second, and third estimation results with first, second, and third predetermined thresholds, respectively; selects a new edge server with which to maintain the service session and initiates a service migration request, when the first predetermined threshold is triggered; initiates a wireless access handover request, when only the second predetermined threshold is triggered; and selects a new edge server with which to maintain the service session and initiates a service migration request, when only the third predetermined threshold is triggered and one of two predetermined conditions is met.

18 Claims, 9 Drawing Sheets

(58) Field of Classification Search
CPC ........... H04W 36/0019; H04W 36/083; H04W 36/085; H04W 36/087; H04W 36/13; H04W 36/302; H04W 36/304
See application file for complete search history.

(56) References Cited

U.S. PATENT DOCUMENTS

| | | | |
|---|---|---|---|
| 2019/0227949 A1 | 7/2019 | Bernat | |
| 2020/0154459 A1* | 5/2020 | Mukherjee | ............... H04W 8/08 |
| 2021/0067605 A1* | 3/2021 | Roth | ................... H04L 67/1095 |
| 2023/0239784 A1* | 7/2023 | Zhang | ............... H04W 52/0258 |
| | | | 370/318 |

OTHER PUBLICATIONS

Wang et al., "Dynamic Service Migration in Mobile Edge Computing Based on Markov Decision Process," arXiv:1506.05261v2 [cs.DC], May 8, 2019, found at https://arxiv.org/pdf/1506.05261.pdf.

Xu et al., "PDMA: Probabilistic Service Migration Approach for Delay-Aware and Mobility-Aware Mobile Edge Computing," arXiv:2106.05584v1 [cs.DC], Jun. 10, 2021, found at https://arxiv.org/pdf/2106.05584.pdf.

Li et al., "Deep Reinforcement Learning for Collaborative Edge Computing in Vehicular Networks," arXiv:2010.01722v1 [eess.SY], Oct. 5, 2020, found at https://arxiv.org/pdf/2010.01722.pdf.

Park et al., "A Novel Deep Reinforcement Learning Based Service Migration Model for Mobile Edge Computing," Proceedings of the 2020 IEEE/ACM 24th International Symposium on Distributed Simulation and Real Time Applications (DS-RT), abstract linked at https://ieeexplore.ieee.org/abstract/document/9213536.

Taleb et al., "Follow-Me Cloud: When Cloud Services Follow Mobile Users," IEEE Transactions on Cloud Computing, 2016, found at http://mosaic-lab.org/uploads/papers/537617ad-bdb4-482d-aad7-a4b2a6436ab8.pdf.

* cited by examiner

SYSTEMS AND METHODS FOR MAINTAINING A SERVICE SESSION IN AN AUTOMOTIVE EDGE COMPUTING ENVIRONMENT

TECHNICAL FIELD

The subject matter described herein generally relates to vehicles and, more particularly, to systems and methods for maintaining a service session in an automotive edge computing environment.

BACKGROUND

In a variety of applications, including Advanced Driver-Assistance Systems (ADASs) and perception services for autonomous driving, a vehicle communicates with a network of edge servers for computational support. In such an automotive edge computing environment, one challenge is to maintain (preserve the continuity of) a service session between a vehicle and the network of edge servers while the vehicle is moving. Maintaining the service session can involve deciding when the vehicle should initiate migration from the current edge server to a new edge server and deciding which edge server among a plurality of possible choices should be the new edge server. Another challenge is how to allocate communication and computational resources among the connected vehicles in the automotive edge computing environment.

SUMMARY

An example of a system for maintaining a service session in an automotive edge computing environment is presented herein. The system comprises one or more processors and a memory communicably coupled to the one or more processors. The memory stores a resource and status tracking module including instructions that when executed by the one or more processors cause the one or more processors to compute a first estimation result pertaining to computation resources of a current edge server with which a vehicle is in communication to conduct the service session. The resource and status tracking module also includes instructions that when executed by the one or more processors cause the one or more processors to compute a second estimation result pertaining to link quality of a communication link between the vehicle and the current edge server. The resource and status tracking module also includes instructions that when executed by the one or more processors cause the one or more processors to compute a third estimation result pertaining to service quality associated with the service session. The memory also stores a triggering module including instructions that when executed by the one or more processors cause the one or more processors to compare the first estimation result, the second estimation result, and the third estimation result with a first predetermined threshold, a second predetermined threshold, and a third predetermined threshold, respectively. The triggering module also includes instructions that when executed by the one or more processors cause the one or more processors to select a new edge server with which to maintain the service session and initiate a service migration request, when the first predetermined threshold is triggered. The triggering module also includes instructions that when executed by the one or more processors cause the one or more processors to initiate a wireless access handover request to switch the communication link from a current base station to a new base station, when only the second predetermined threshold is triggered. The triggering module also includes instructions that when executed by the one or more processors cause the one or more processors to select a new edge server with which to maintain the service session and initiate a service migration request, when only the third predetermined threshold is triggered and one of an unsuccessful request for additional computation resources from the current edge server and a service cost for the current edge server in excess of a predetermined amount occurs.

Another embodiment is a non-transitory computer-readable medium for maintaining a service session in an automotive edge computing environment and storing instructions that when executed by one or more processors cause the one or more processors to compute a first estimation result pertaining to computation resources of a current edge server with which a vehicle is in communication to conduct the service session. The instructions also cause the one or more processors to compute a second estimation result pertaining to link quality of a communication link between the vehicle and the current edge server. The instructions also cause the one or more processors to compute a third estimation result pertaining to service quality associated with the service session. The instructions also cause the one or more processors to compare the first estimation result, the second estimation result, and the third estimation result with a first predetermined threshold, a second predetermined threshold, and a third predetermined threshold, respectively. The instructions also cause the one or more processors to select a new edge server with which to maintain the service session and initiate a service migration request, when the first predetermined threshold is triggered. The instructions also cause the one or more processors to initiate a wireless access handover request to switch the communication link from a current base station to a new base station, when only the second predetermined threshold is triggered. The instructions also cause the one or more processors to select a new edge server with which to maintain the service session and initiate a service migration request, when only the third predetermined threshold is triggered and one of an unsuccessful request for additional computation resources from the current edge server and a service cost for the current edge server in excess of a predetermined amount occurs.

In another embodiment, a method of maintaining a service session in an automotive edge computing environment is disclosed. The method comprises computing a first estimation result pertaining to computation resources of a current edge server with which a vehicle is in communication to conduct the service session. The method also includes computing a second estimation result pertaining to link quality of a communication link between the vehicle and the current edge server. The method also includes computing a third estimation result pertaining to service quality associated with the service session. The method also includes comparing the first estimation result, the second estimation result, and the third estimation result with a first predetermined threshold, a second predetermined threshold, and a third predetermined threshold, respectively. The method also includes selecting a new edge server with which to maintain the service session and initiating a service migration request, when the first predetermined threshold is triggered. The method also includes initiating a wireless access handover request to switch the communication link from a current base station to a new base station, when only the second predetermined threshold is triggered. The method also includes selecting a new edge server with which to maintain the service session and initiating a service migration request, when only the third predetermined threshold is triggered and one of an unsuccessful request for additional computation resources from the current edge server and a service cost for the current edge server in excess of a predetermined amount occurs.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Various embodiments of systems and methods for maintaining a service session in an automotive edge computing environment disclosed herein address the challenges of determining when a connected vehicle should initiate a request for service migration to a new edge server, which edge server among a plurality of possible choices should be selected as the new edge server, and how communication and computational resources should be allocated among the connected vehicles in the automotive edge computing environment. These various embodiments combine a plurality of threshold-tested estimation results concerning different aspects of a service session with machine-learning techniques. For example, in some embodiments, a personalized machine-learning model is used to select the new edge server, when a vehicle has initiated a request for service migration to maintain a current service session.

Figure 1:
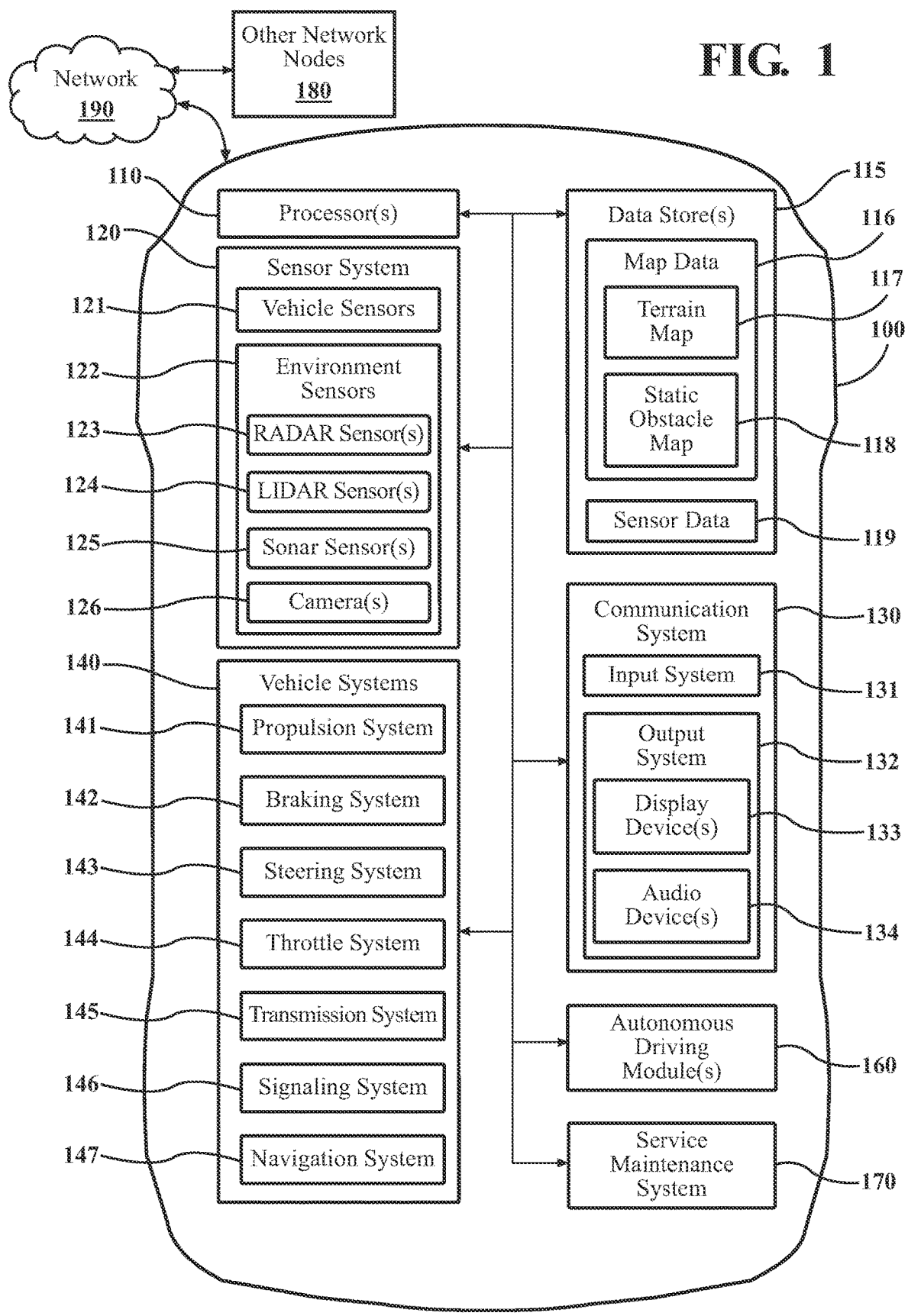
FIG. 1 illustrates one embodiment of a vehicle within which systems and methods disclosed herein may be implemented.

Referring to FIG. 1, an example of a vehicle 100, in which systems and methods disclosed herein can be implemented, is illustrated. A vehicle 100 is sometimes referred to herein as an "ego vehicle" or as a "connected vehicle." As used herein, a "vehicle" is any form of motorized transport. One example of a "vehicle," without limitation, is an automobile. An "ego vehicle" is a particular vehicle 100 from whose perspective a service session with a network of edge servers is to be maintained with the assistance of a service maintenance system. A "connected vehicle" is a vehicle 100 that is capable of communicating with other network nodes (e.g., cloud servers, edge servers, infrastructure devices, other vehicles, etc.) over one or more networks. In the various embodiments described herein, a vehicle 100 is a connected vehicle that is at least capable of communicating with one or more cloud servers and one or more edge servers.

Herein, a "service session" refers to a series of communications between an ego vehicle and one or more edge servers that are part of an automotive edge computing environment to support a service or application in the ego vehicle. Examples of such services or applications include, without limitation, Advanced Driver Assistance System (ADAS) features (e.g., collision avoidance, lane-change assistance, blind-spot detection, etc.) and perception-related services for autonomous or semi-autonomous driving such as localization, object detection, object tracking, and traffic-signal state detection. One characteristic that these various applications and services have in common is that they involve the transmission of large amounts of data (e.g., video data and/or sensor data) between a connected vehicle 100 and an edge server. Some of the services and applications are performed in real time or substantially in real time. An important rationale for an automotive edge computing environment is that the edge servers can provide additional computational resources above and beyond what is available in the on-board computing systems of the connected vehicles 100.

In some embodiments, vehicle 100 is manually driven by a human driver. In other embodiments, vehicle 100 can operate, at least some of the time, in a mostly- or fully-autonomous mode (e.g., what the automotive industry refers to as autonomy Levels 3-5). In some embodiments, vehicle 100 includes an intelligent driving assistance system such as an ADAS (not shown in FIG. 1).

The vehicle 100 can include a service maintenance system 170 or capabilities to support or interact with the service maintenance system 170 and thus benefits from the functionality discussed herein. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including service maintenance system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 can communicate with other network nodes 180 (e.g., other connected vehicles, cloud servers, edge servers, roadside units, infrastructure) via a network 190. In some embodiments, network 190 includes the Internet. Network 190 can include technologies such as cellular data (e.g., LTE, 5G, 6G, etc.) and/or Dedicated Short Range Communications (DSRC).

Some of the possible elements of the vehicle 100 are shown in FIG. 1 and will be described in connection with subsequent figures. However, a description of many of the elements in FIG. 1 will be provided after the discussion of FIGS. 2-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122. Environment sensors 122 generally include, without limitation, radar sensor(s) 123, Light Detection and Ranging (LIDAR) sensor(s) 124, sonar sensor(s) 125, and camera(s) 126.

In embodiments in which vehicle 100 is capable of semi-autonomous or fully autonomous operation, vehicle 100 includes autonomous driving module(s) 160 to control various vehicle systems 140. When vehicle 100 is operating in a semi-autonomous or fully autonomous driving mode, the environment sensors 122 discussed above support autonomous driving module(s) 160 in controlling vehicle 100 by providing perceptual functions such as localization, object detection, and object tracking. Such functions are examples of what is sometimes referred to as "scene understanding." In other embodiments, the environment sensors 122 can also support ADAS features such as blind-spot detection, backup assistance, parking assistance, lane-change assistance, and collision avoidance. During a service session, an ego vehicle 100 may make use of various vehicle sensors 121 and environment sensors 122 in connection with the kinds of applications (e.g., ADAS features, perceptual functions, etc.) that are supported by an automotive edge computing environment, as discussed above.

Figure 2:
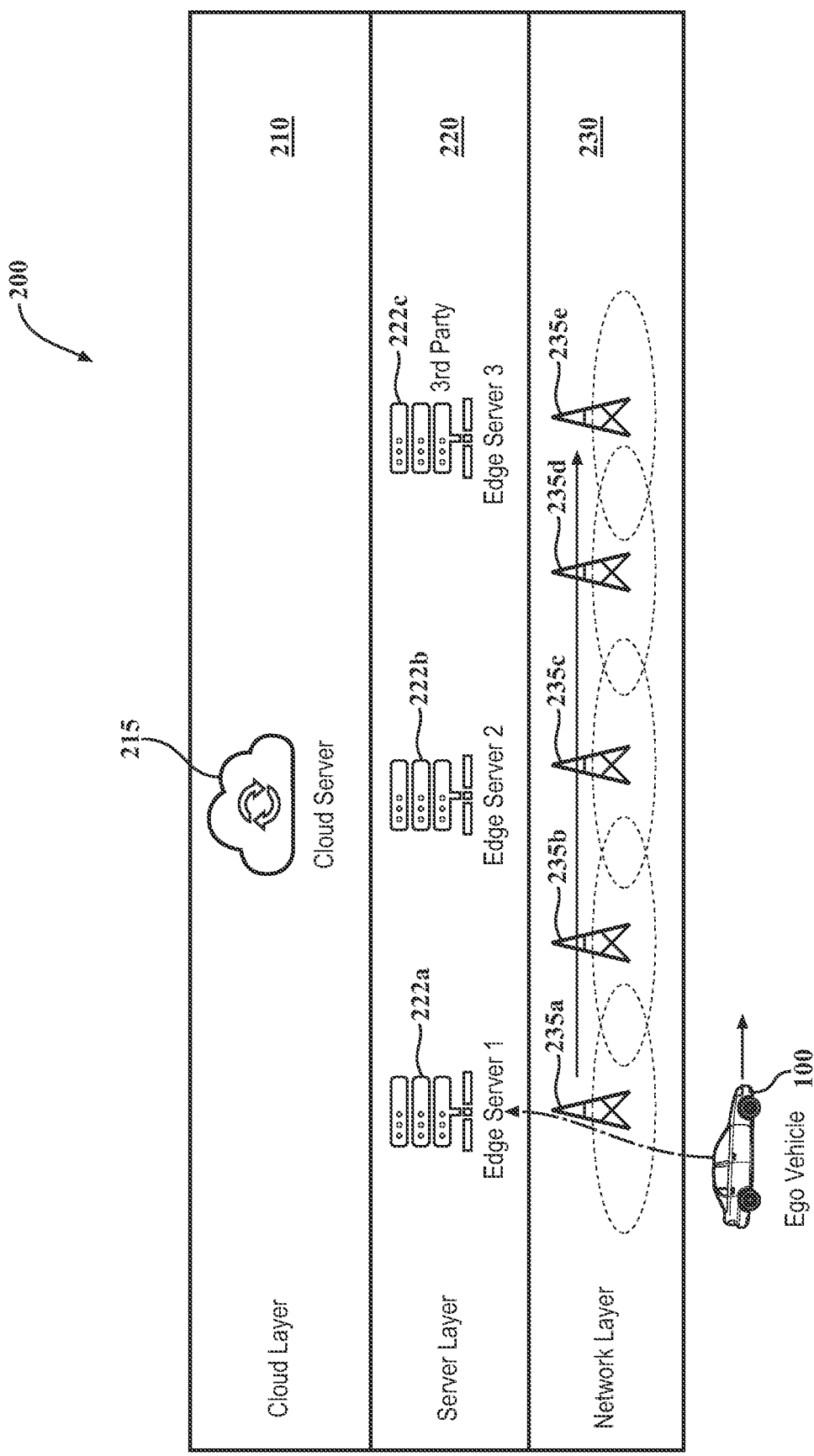
FIG. 2 illustrates an automotive edge computing environment, in accordance with an illustrative embodiment of the invention.

FIG. 2 illustrates an automotive edge computing environment 200, in accordance with an illustrative embodiment of the invention. As shown in FIG. 2, automotive edge computing environment 200 includes several layers: cloud layer 210, edge layer 220, and network layer 230. Cloud layer 210 includes at least one cloud server 215. In some embodiments, a primary role of cloud server 215 is to serve as a platform for training the machine-learning (ML) models in service maintenance system 170. These ML models are discussed further below. Another role of cloud server 215, in some embodiments, is to optimize, update, and distribute, to connected vehicles 100, thresholds against which computed estimation results (figures of merit used to trigger decisions in service maintenance system 170) are compared.

Edge layer 220 includes one or more edge servers. In the illustrative automotive edge computing environment 200 depicted in FIG. 2, edge layer 220 includes Edge Server 1 (222a), Edge Server 2 (222b), and Edge Server 3 (222c). In this particular example, Edge Server 1 (222a) and Edge Server 2 (222b) are operated by a particular vehicle manufacturer (e.g., the vehicle manufacturer that manufactured vehicle 100), and Edge Server 3 (222c) is operated by a third-party entity. As explained further below, which entity controls a particular edge server can impact the information service maintenance system 170 is able to acquire from that edge server.

Network layer 230 includes one or more base stations (e.g., to support cellular communication). In the example of FIG. 2, network layer 230 includes five base stations, base stations 235a-e.

In automotive edge computing environment 200, one or more connected vehicles 100 can communicate with the edge servers (222a-c) and/or the cloud server 215 via the base stations 235a-e. As those skilled in the art are aware, as a vehicle 100 travels along a roadway, it may become necessary for the vehicle 100 to migrate (change or switch) a service session already in progress from a current edge server to a new/different edge server in order to maintain that service session. Also, it may become necessary for the vehicle 100 to communicate with the current edge server via a new/different base station 235 to maintain the service session, if the vehicle 100 leaves the coverage area or "cell" associated with the current base station 235. In the example of FIG. 2, vehicle 100 is depicted as communicating with Edge Server 1 (222a) via base station 235a. A primary purpose of service maintenance system 170 is to maintain a service session for a vehicle 100, once established, by triggering and coordinating the migration of a service session from one edge server to another and/or to maintain the service session in spite of radio-access handovers (changes of base station) that might occur.

Figure 3:
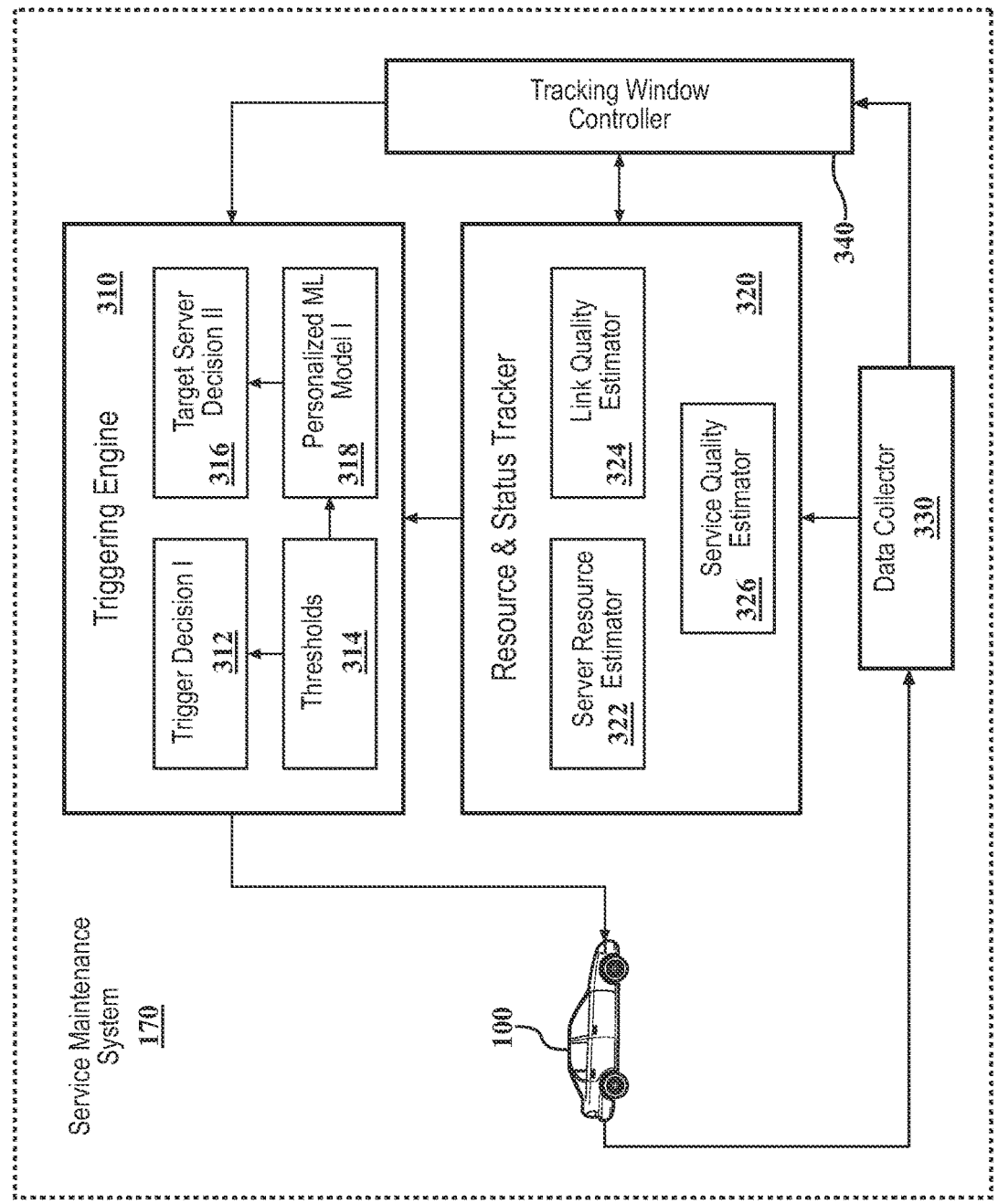
FIG. 3 is a functional block diagram of a service maintenance system, in accordance with an illustrative embodiment of the invention.

FIG. 3 is a functional block diagram of a service maintenance system 170, in accordance with an illustrative embodiment of the invention. In the embodiment of FIG. 3, service maintenance system 170 includes the following functional components: a triggering engine 310, a resource and status tracker 320, a data collector 330, and a tracking window controller 340. In this embodiment, service maintenance system 170 is deployed in a vehicle 100 (i.e., the system is installed as a standalone system in a vehicle 100, though the system may, from time to time, receive trained-ML-model parameters and updated thresholds from a cloud server 215).

Data collector 330 is responsible for gathering, recording, and storing ego-vehicle-side, edge-server-side, and network-side data to support and facilitate the other components in service maintenance system 170. For example, the ego-vehicle-side data (data pertaining to an ego vehicle 100) can include service/application status, $S_{service}$; service/application quality-of-service (QoS) requirements, $R_{service}$; navigation/route data, $N_{ego}$, which can include information such as geolocation data, road-geometry information, information regarding intersections and traffic signals, etc.; driving-behavior data (e.g., speed, interactions with services/applications); and application/service preferences (e.g., timing, duration). In some embodiments, $S_{service}$ is represented as an n-tuple or vector: $S_{service} = \{l_{service}, p_{service}, m_{service}, \ldots\}$, where $l_{service}$ is the service latency, $p_{service}$ is the price/cost of the service, and $m_{service}$ is the memory usage associated with the service. Similarly, in some embodiments, $R_{service} = \{L_{service}, P_{service}, M_{service}, \ldots\}$, where $L_{service}$ is the required service latency, $P_{service}$ is the maximum acceptable service cost, and $M_{service}$ is the minimum memory requirement for the service. The variables in $S_{service}$ and $R_{service}$ may change, depending on the particular service/application a vehicle 100 is running at a given time.

The edge-server-side data can include the free computation resources at an edge server 222, $C_{free}$; the computation resources allocated to an ego vehicle 100, $C_{ego}$; and the price standard that pertains to a service session involving the edge server 222 in question, $P_{server}$.

The network-side data can include the received signal strength, RSS, and the bandwidth allocated to the ego vehicle 100, $B_{ego}$. It should be noted that when an ego vehicle 100 is in communication with a third-party server (such as Edge Server 3 (222c) in FIG. 2), the vehicle 100 might not be permitted to acquire information such as $C_{free}$ and $C_{ego}$. In such a situation, data collector 330 replaces those parameters with the computation latency, $l_{computation}$.

Resource and status tracker 320 is responsible for estimating (computing) a set of three figures of merit (herein called "estimation results") that are used by triggering engine 310 in making decisions regarding service migration. As shown in FIG. 3, resource and status tracker 320 includes the following three components: server resource estimator 322, link quality estimator 324, and service quality estimator 326. Each of these components outputs a particular estimation result, as illustrated further in FIG. 4.

Figure 4:
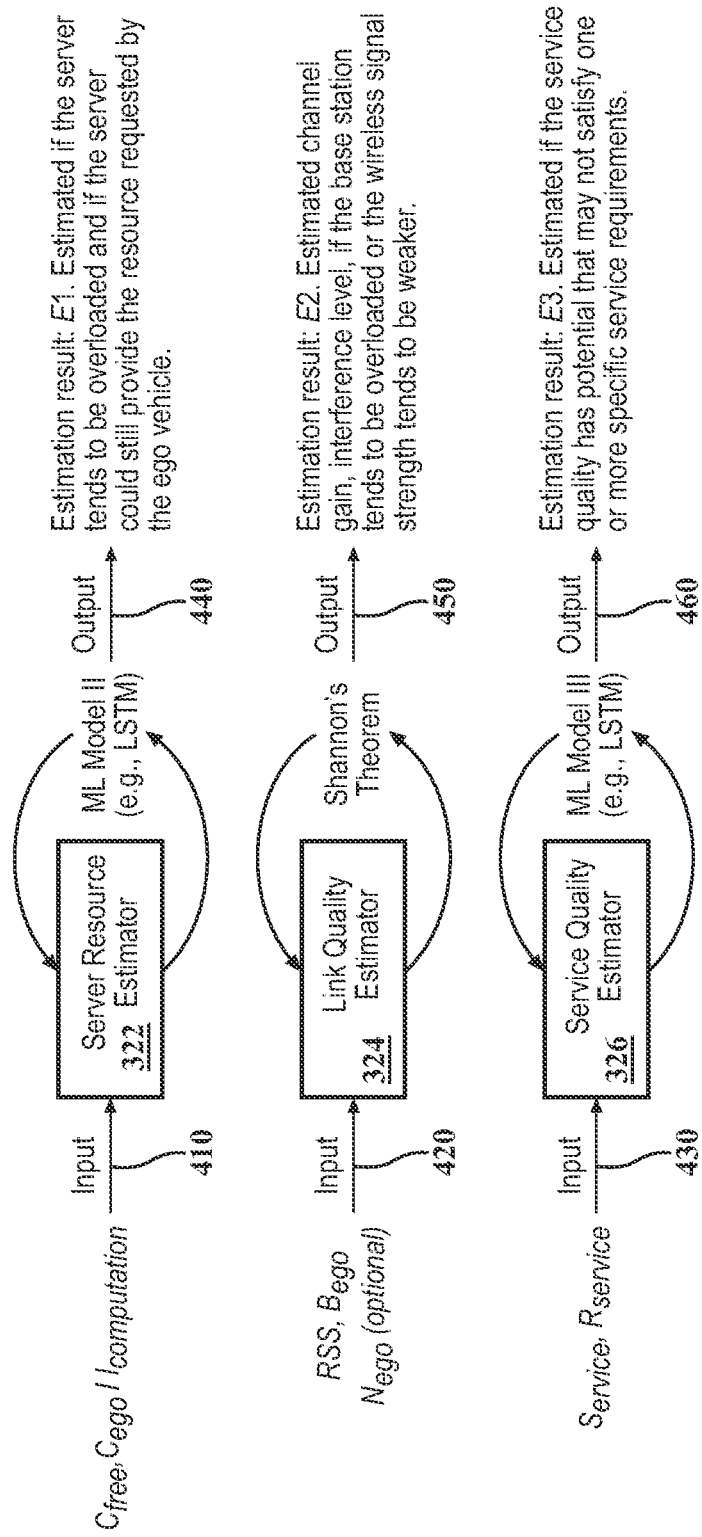
FIG. 4 is a diagram of components of a service maintenance system that compute a set of estimation results, in accordance with an illustrative embodiment of the invention.

FIG. 4 is a diagram of components of a service maintenance system 170 that compute a set of estimation results, in accordance with an illustrative embodiment of the invention. As indicated in FIG. 4, server resource estimator 322 receives, as input 410, variables such as $C_{free}$, $C_{ego}$, and $l_{computation}$ and uses a ML model ("ML Model II," in the embodiment of FIG. 4) to produce an output 440, E1 (Estimation Result 1). E1 estimates the degree to which the current edge server 222 with which a vehicle 100 is communicating is overloaded and whether that edge server 222 is still capable of providing the resources requested by the vehicle 100. In some embodiments, ML Model II is a Long Short Term Memory (LSTM) neural network that has previously been trained at a cloud server 215 or other system separate from vehicle 100.

As also indicated in FIG. 4, link quality estimator 324 receives, as input 420, variables such as RSS, $B_{ego}$, and $N_{ego}$ and uses principles such as Shannon's Theorem to produce an output 450, E2 (Estimation Result 2). E2 estimates the channel gain, interference level, and whether the current base station 235 via which a vehicle 100 is communicating is overloaded or the wireless signal is weaker than desired.

As also indicated in FIG. 4, service quality estimator 326 receives, as input 430, variables such as $S_{service}$ and $R_{service}$ and uses a ML model ("ML Model III," in the embodiment of FIG. 4) to produce an output 460, E3 (Estimation Result 3). E3 estimates whether the service quality (i.e., service performance, such as latency or associated perception accuracy) might fail to satisfy one or more predetermined service-quality requirements. In some embodiments, ML Model III is a LSTM neural network that has previously been trained at a cloud server 215 or other system separate from vehicle 100.

As shown in FIG. 4, the estimation results E1, E2, and E3 are output to triggering engine 310.

Triggering engine 310 is responsible for (1) determining when an ego vehicle 100 should trigger (initiate) migration of a service session from the current edge server 222 to a new edge server 222 (Trigger Decision I) and (2) determining which edge server 222 should be selected as the new edge server 222 (Target Server Decision II), when Trigger Decision I applies. As shown in FIG. 4, triggering engine 310, in this embodiment, includes four components: Trigger Decision I 312, which concerns the decision to migrate service from the current edge server 222 with which an ego vehicle 100 is in communication to a new edge server 222; Target Server Decision II 316, which concerns the decision of which edge server 222 among a plurality of possible edge servers 222 should be selected as the new edge server 222, when Trigger Decision I applies (i.e., when the decision is made to migrate a service session to a different edge server 222); predetermined thresholds 314 that are used in making Trigger Decision I 312 and Target Server Decision II 316; and a Personalized ML Model I 318, a ML model that triggering engine 310 uses, at least in part, to select the new edge server 222 (the "target server"), when Trigger Decision I is in effect.

Trigger Decision I is made based on the resource and status tracker 320 outputs E1, E2, and E3. Specifically, E1 is compared with a corresponding predetermined threshold, th1; E2 is compared with a corresponding predetermined threshold, th2; and E3 is compared with a corresponding threshold, th3. Herein, a given threshold (th1, th2, or th3) is said to be "triggered" when the associated estimation result (E1, E2, or E3, respectively) meets a predetermined condition relative to that threshold (e.g., such as being greater than or less than the threshold). For example, in some embodiments, th1 is triggered if E1>th1, th2 is triggered if E2>th2, and th3 is triggered if E3>th3. As mentioned above, in some embodiments, a cloud server 215 can, as needed or periodically, optimize and update th1, th2, and th3 and distribute the updated predetermined thresholds 314 to one or more connected vehicles 100.

Target Server Decision II is made based on a pre-trained personalized ML model (the "Personalized ML Model I 318" mentioned above). This Personalized ML Model I 318 is trained based on historical driving data (e.g., route information, driving behavior, service/application preferences and interactions, and trigger scenarios) associated with a particular ego vehicle 100 and its driver(s)/operator(s). Personalized ML Model I 318 is trained at a cloud server 215, in some embodiments. In training Personalized ML Model I 318 and the other ML models deployed by service maintenance system 170 (e.g., ML Models II and III discussed above), techniques such as supervised or self-supervised machine learning can be used to train the weights and parameters of one or more neural networks.

Figure 5:
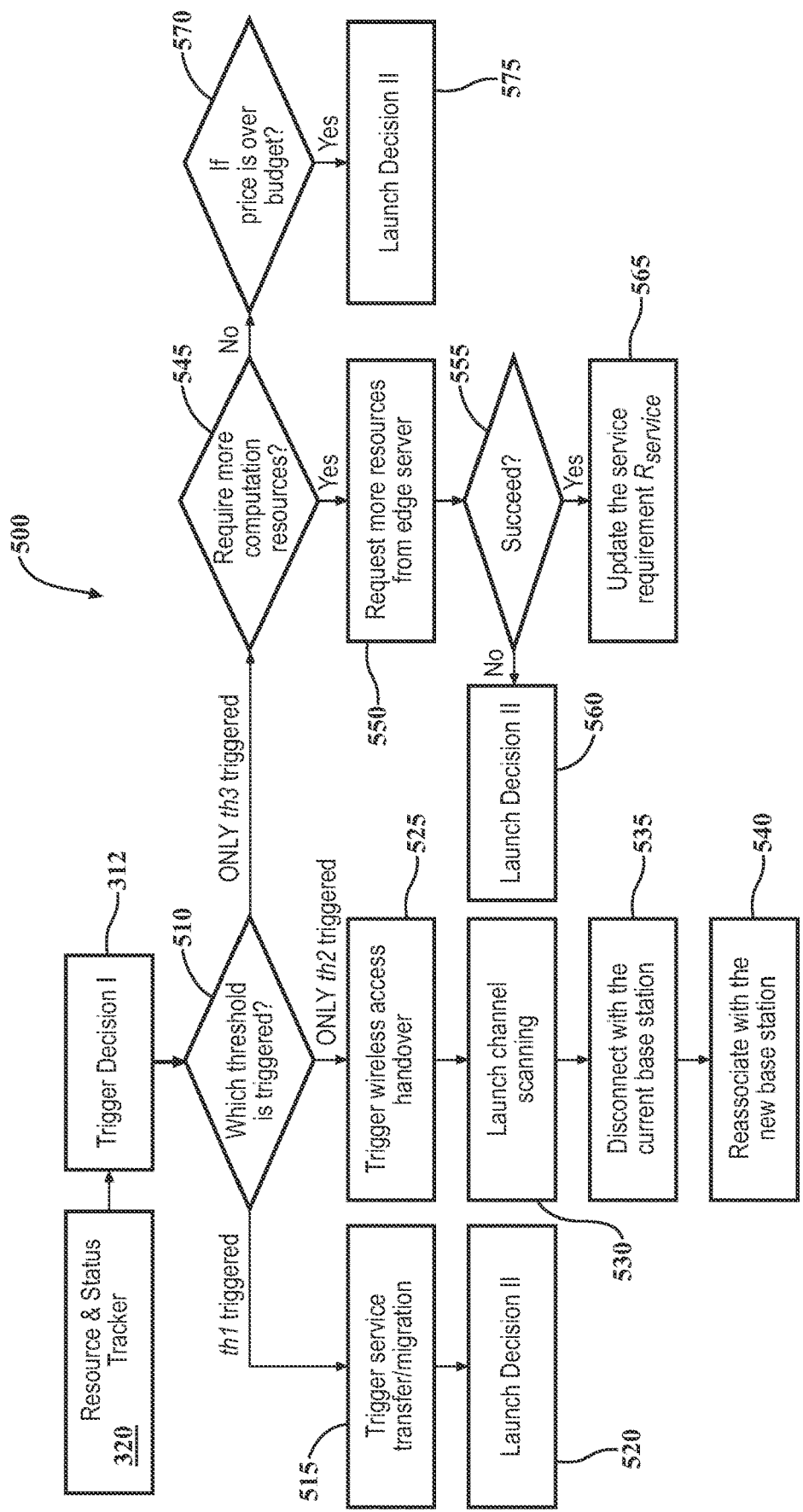
FIG. 5 is a flowchart illustrating the flow of logic in a service maintenance system, in accordance with an illustrative embodiment of the invention.

FIG. 5 is a flowchart illustrating the flow of logic in a service maintenance system 170, in accordance with an illustrative embodiment of the invention. In FIG. 5, Trigger Decision I (service migration to a new edge server 222) is in effect (block 312) based on the output of resource and status tracker 320, as discussed above. FIG. 5 shows the flow of logic once Trigger Decision I applies.

At block 510, triggering engine 310 determines which threshold(s) have been triggered. If th1 is triggered, control proceeds to block 515, and triggering engine 310 initiates migration of a service session to a new edge server 222. At block 520, triggering engine 310 initiates the process of selecting a new edge server 222 (Target Server Decision II). This can include sending a communication from the vehicle 100 to the target (new) edge server 222 requesting server migration.

If, at block 510, only th2 is triggered, control proceeds to block 525, and triggering engine 310 initiates a wireless access handover to switch a communication link between the ego vehicle 100 and a current base station 235 to a different base station 235. At block 530, triggering engine 310 commences channel scanning to identify a new base station 235. At block 535, triggering engine 310 disconnects from the current base station 235, and, at block 540, triggering engine 310 reassociates with the new base station 235. Since the actions just described relate to a wireless access handover and th1 is not triggered, the ego vehicle 100 can remain in communication with the current edge server 222 as the service session proceeds.

If, at block 510, only th3 is triggered, triggering engine 310 determines, at block 545, whether the ego vehicle 100 requires additional computational resources. If so, triggering engine 310 requests the additional resources from the current edge server 222 at block 550. If that attempt fails at block 555, triggering engine 310 initiates the process of selecting a new edge server 222 (Target Server Decision II) at block 560. If the attempt succeeds at block 555, resource and status tracker 320 updates $R_{service}$ at block 565. If, at block 545, the ego vehicle 100 does not require additional computational resources, triggering engine 310 checks, at block 570, whether the price of the current service session at the current edge server 222 is in excess of a predetermined amount (e.g., a specified budget). If so, triggering engine 310 initiates the process of selecting a new edge server 222 (Target Server Decision II) at block 575.

Figure 6:
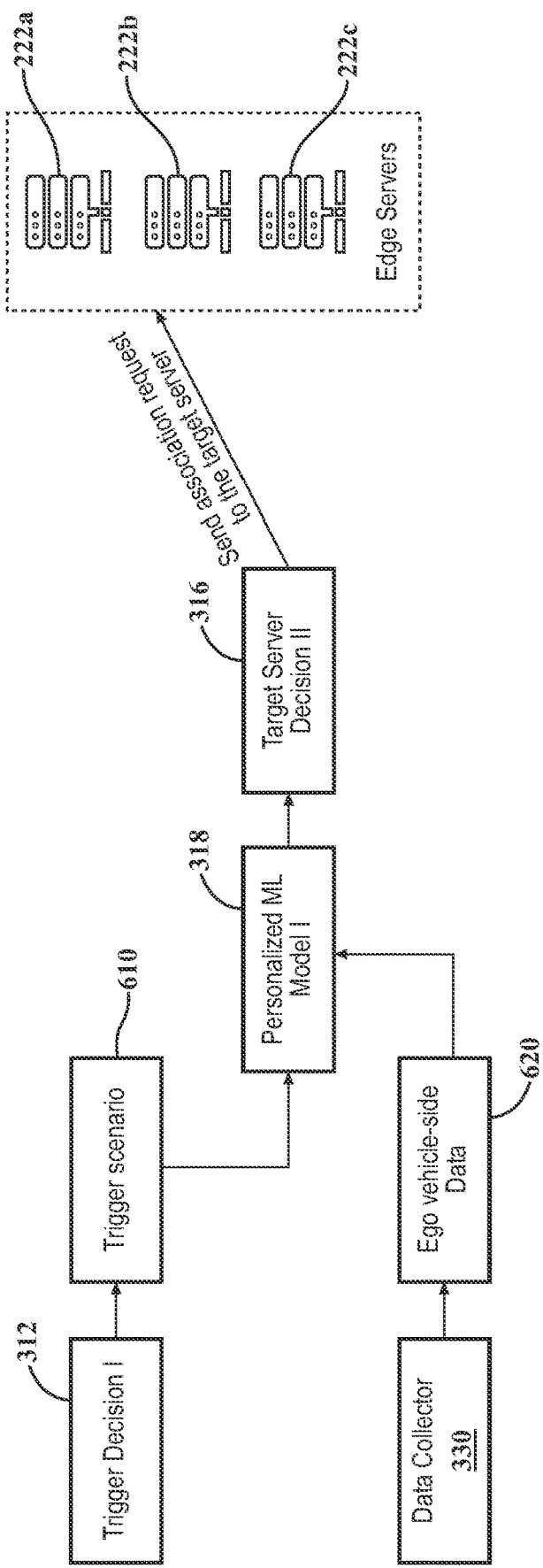
FIG. 6 is a block diagram of components in a service maintenance system that select a new edge server in connection with a service migration, in accordance with an illustrative embodiment of the invention.

FIG. 6 is a block diagram of components in a service maintenance system 170 that select a new edge server 222 in connection with a service migration, in accordance with an illustrative embodiment of the invention. Once triggering engine 310 has determined that a service migration should be performed (Trigger Decision I 312), the applicable trigger scenario 610 (see the logic flow discussed above in connection with FIG. 5) leads to initiation of a process for evaluating Target Server Decision II. This process involves Personalized ML Model I 318 taking into account the trigger scenario (the outcomes of the three threshold tests discussed above) and ego-vehicle-side data 620 (e.g., historical driving data associated with the ego vehicle 100) received from data collector 330 to output Target Server Decision II 316. Target Server Decision II 316 is a selection of which edge server 222 (in this particular example, Edge Server 1 (222*a*), Edge Server 2 (222*b*), or Edge Server 3 (222*c*)) should be the new edge server to continue the current service session with the ego vehicle 100. Once triggering engine 310 has determined which edge server 222 should be the new edge server 222, service maintenance system 170 can communicate with the target edge server 222 (i.e., the new edge server 222) via network 190 to request migration of the service session to that edge server 222.

Referring again to FIG. 3, tracking window controller 340 is responsible for dynamically adjusting the frequency of executing the actions performed by the resource and status tracker 320 and the triggering engine 310. More specifically, the role of tracking window controller 340 is to prevent too-frequent execution of those tasks, which would consume excessive on-board computation resources at the ego vehicle 100. Tracking window controller 340 analyzes the outputs of resource and status tracker 320 to determine dynamically what the tracking window's size g, in seconds, should be. The larger g is, the less frequently the evaluation results E1, E2, and E3 are computed and the less often triggering engine 310 performs the associated threshold tests discussed above. To adjust the size of g, tracking window controller 340 defines a current recorded state vector for the ego vehicle 100: $\Phi_{ego}^{t}$=(E1, E2, E3). Tracking window controller 340 also defines the current variation rate of the state vector as $$\Phi''_{ego} = \left\| \frac{\Phi'_{ego} - \Phi'^{-g}_{ego}}{g} \right\|$$

and the current variation trend of the state vector as $\Phi''_{ego}{}^{t}=\Phi'_{ego}{}^{t}-\Phi'_{ego}{}^{t-g}$. The logic implemented by tracking window controller 340 using these mathematical concepts is explained below in connection with FIG. 7.

Figure 7:
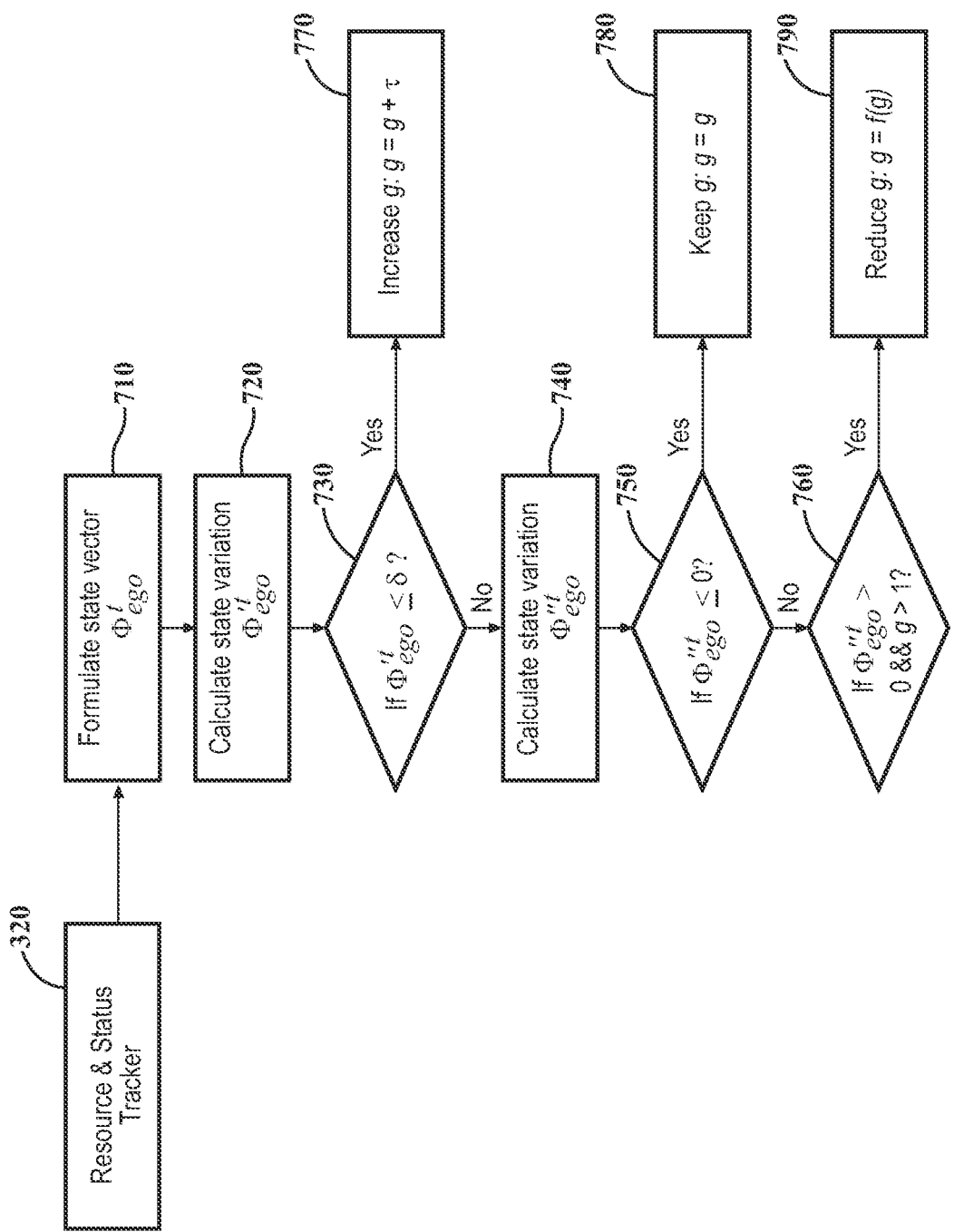
FIG. 7 is a flowchart illustrating the logic of a tracking window controller in a service maintenance system, in accordance with an illustrative embodiment of the invention.

FIG. 7 is a flowchart illustrating the logic of a tracking window controller 340 in a service maintenance system 170, in accordance with an illustrative embodiment of the invention. As indicated in FIG. 7, the outputs of resource and status tracker 320 are submitted to tracking window controller 340. At block 710, tracking window controller 340 formulates the state vector $\Phi_{ego}{}^{t}$. At block 720, tracking window controller 340 calculates the state variation rate $\Phi'_{ego}{}^{t}$. At block 730, tracking window controller 340 determines whether the state variation rate $\Phi'_{ego}{}^{t}$ is less than or equal to a predetermined threshold, δ. If so, tracking window controller 340, at block 770, increases the tracking window size g: g=g+τ. If the condition tested at block 730 is not satisfied, tracking window controller 340 calculates the state variation trend $\Phi''_{ego}{}^{t}$ at block 740. At block 750, tracking window controller 340 determines whether $\Phi''_{ego}{}^{t}$ is less than or equal to zero. If so, tracking window controller 340, at block 780, keeps g the same as it is currently. If the condition tested at block 750 is not satisfied, tracking window controller 340, at block 760, determines whether $\Phi''_{ego}{}^{t}$ is greater than zero and whether g is greater than unity. If both of these conditions are satisfied, tracking window controller 340, at block 790, reduces g in accordance with a predetermined function. That is, g=ƒ(g).

Figure 8:
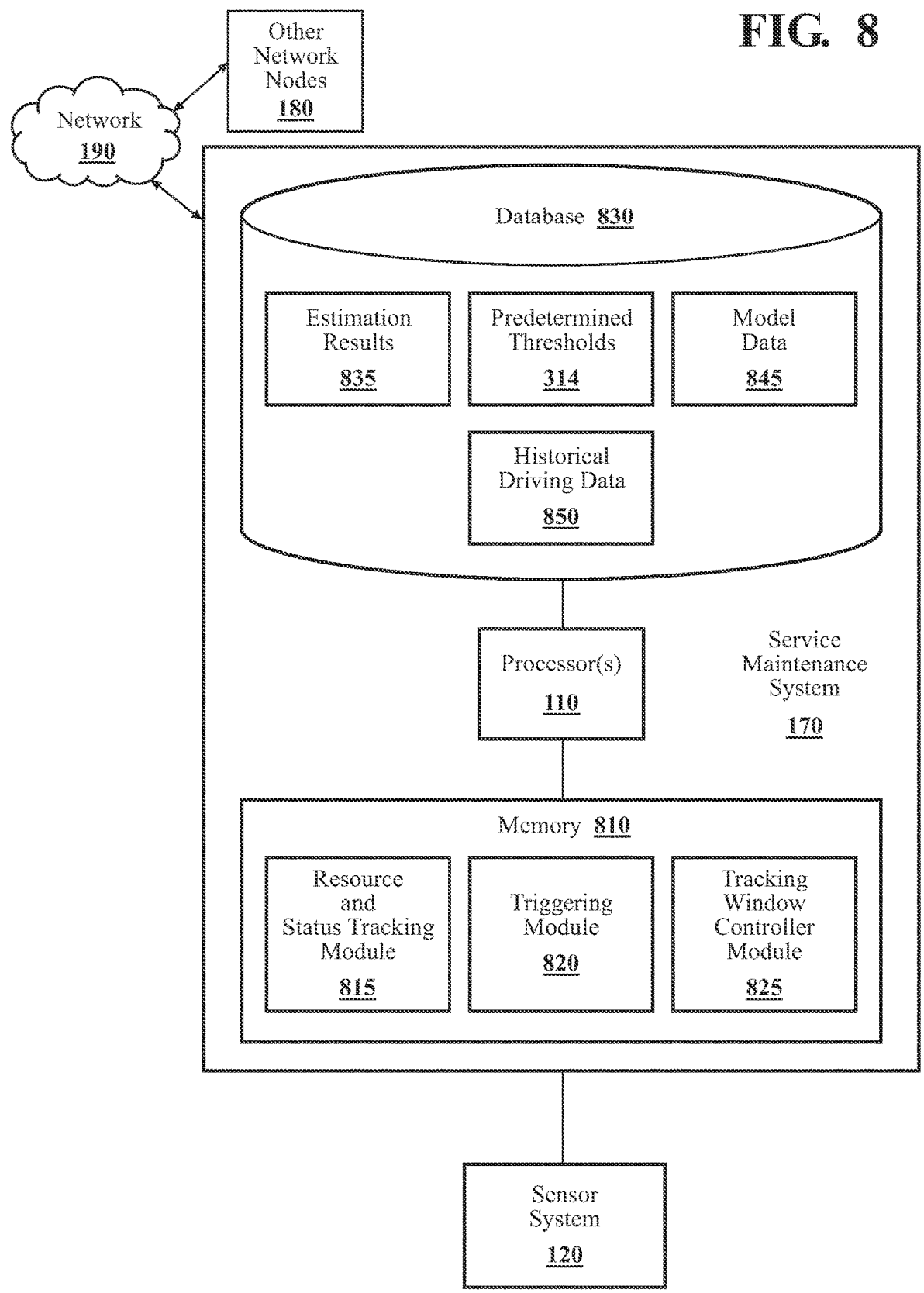
FIG. 8 is a block diagram of a system for maintaining a service session in an automotive edge computing environment, in accordance with an illustrative embodiment of the invention.

FIG. 8 is a block diagram of a system for maintaining a service session in an automotive edge computing environment (a service maintenance system 170), in accordance with an illustrative embodiment of the invention. As described above in connection with FIG. 3, in this embodiment, service maintenance system 170 is a standalone in-vehicle system that can communicate, via network 190, with other network nodes 180 such as cloud servers 215, edge servers 222, and other connected vehicles. As shown in FIG. 8, one or more processors 110 from the vehicle 100 of FIG. 1 are included in service maintenance system 170. In general, the one or more processors 110 may be a part of service maintenance system 170, service maintenance system 170 may include one or more separate processors from the one or more processors 110 of the vehicle 100, or service maintenance system 170 may access the one or more processors 110 through a data bus or another communication path, depending on the embodiment.

In one embodiment, a memory 810 stores a resource and status tracking module 815, a triggering module 820, and a tracking window controller module 825. Though not shown in FIG. 8, memory 810 can also store a data collection module that performs the functions discussed above in connection with data collector 330 (see the discussion regarding FIG. 3 above). The memory 810 is a random-access memory (RAM), read-only memory (ROM), a hard-disk drive, a flash memory, or other suitable memory for storing the modules 815, 820, and 825. The modules 815, 820, and 825 include, for example, computer-readable instructions that, when executed by the one or more processors 110, cause the one or more processors 110 to perform the various functions disclosed herein. More specifically, in the embodiment shown in FIG. 8, resource and status tracking module 815 includes instructions corresponding to the functions described above in connection with resource and status tracker 320, triggering module 820 includes instructions corresponding to the functions described above in connection with triggering engine 310, and tracking window controller module 825 includes instructions corresponding to the functions described above in connection with tracking window controller 340.

In this embodiment, service maintenance system 170 also includes a database 830 to store estimation results 835 (E1, E2, and E3), predetermined thresholds 314 (th1, th2, and th3), and model data 845. Model data 845 can include a variety of different kinds of data (variables, parameters, hyperparameters, results of intermediate calculations, etc.) associated with ML Model II (see the discussion of server resource estimator 322 above), ML Model III (see the discussion of service quality estimator 326 above), and Personalized ML Model I 318 (see the discussion of FIGS. 5 and 6 above). Database 830 can also store historical driving data 850 associated with a specific ego vehicle 100 and its driver(s)/operators(s).

As also shown in FIG. 8, service maintenance system 170 can interface and communicate with the sensor system 120 of vehicle 100.

Resource and status tracking module 815 generally includes instructions that when executed by the one or more processors 110 cause the one or more processors 110 to compute a first estimation result (e.g., E1 discussed above) pertaining to the computation resources of a current edge server 222 with which a vehicle 100 is in communication to conduct a service session. Resource and status tracking module 815 also includes instructions that when executed by the one or more processors 110 cause the one or more processors 110 to compute a second estimation result (e.g., E2 discussed above) pertaining to link quality of a communication link between the vehicle 100 and the current edge server 222 involved in the service session. Resource and status tracking module 815 also includes instructions that when executed by the one or more processors 110 cause the one or more processors 110 to compute a third estimation result (e.g., E3 discussed above) pertaining to the service quality associated with the service session. The estimation results E1, E2, and E3 and how they are produced are discussed in greater detail above in connection with FIG. 4. As discussed above, in some embodiments, E1 is computed, at least in part, using a ML model (e.g., ML Model II discussed above), and E3 is computed, at least in part, using a ML model (e.g., ML Model III discussed above).

Triggering module 820 generally includes instructions that when executed by the one or more processors 110 cause the one or more processors 110 to compare the first estimation result, the second estimation result, and the third estimation result with a first predetermined threshold (e.g., th1 discussed above), a second predetermined threshold (e.g., th2 discussed above), and a third predetermined threshold (e.g., th3 discussed above), respectively. Triggering module 820 also includes instructions that when executed by the one or more processors 110 cause the one or more processors 110 to select a new edge server 222 with which to maintain the service session and initiate a service migration request, when the first predetermined threshold is triggered. Triggering module 820 also includes instructions that when executed by the one or more processors 110 cause the one or more processors 110 to initiate a wireless access handover request to switch the communication link from a current base station 235 to a new base station 235, when only the second predetermined threshold is triggered. Triggering module 820 also includes instructions that when executed by the one or more processors 110 cause the one or more processors 110 to select a new edge server 222 with which to maintain the service session and initiate a service migration request, when only the third predetermined threshold is triggered and one of the following occurs: (1) a request for additional computation resources from the current edge server 222 is unsuccessful or (2) the service cost for the current edge server 222 exceeds a predetermined amount. These various possible outcomes are discussed in greater detail above in connection with FIG. 5.

Triggering module 820 can also include instructions that when executed by the one or more processors 110 cause the one or more processors 110, as discussed above in connection with triggering engine 310, to select the new edge server 222, at least in part, using a ML model such as the Personalized ML Model I 318 discussed above. As discussed above, in some embodiments, the Personalized ML Model I 318 is personalized for a specific vehicle 100 based on historical driving data 850 associated with the vehicle 100 and its driver(s)/operator(s).

Triggering module 820, in some embodiments, also includes instructions that when executed by the one or more processors 110 cause the one or more processors 110 to receive, at an ego vehicle 100, the first predetermined threshold, the second predetermined threshold, and the third predetermined threshold from a cloud server 215 after the first predetermined threshold, the second predetermined threshold, and the third predetermined threshold have been optimized and updated by the cloud server 215, as discussed above.

Tracking window controller module 825 generally includes instructions that when executed by the one or more processors 110 cause the one or more processors 110 to adjust dynamically how often the first estimation result, the second estimation result, and the third estimation result are computed and compared, respectively, with the first predetermined threshold, the second predetermined threshold, and the third predetermined threshold, as discussed above in connection with FIGS. 3 and 7.

Figure 9:
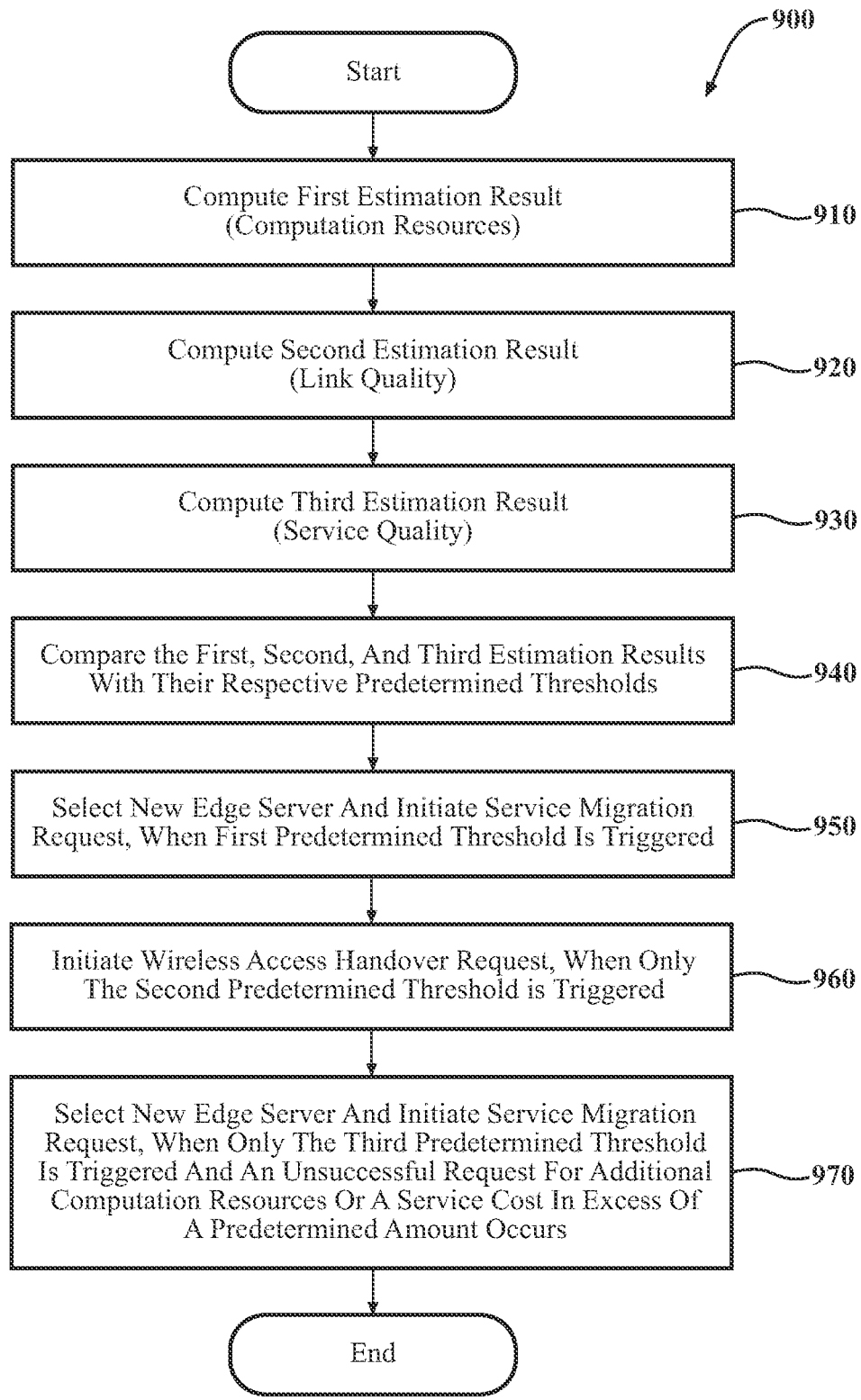
FIG. 9 is a flowchart of a method of maintaining a service session in an automotive edge computing environment, in accordance with an illustrative embodiment of the invention.

FIG. 9 is a flowchart of a method 900 of maintaining a service session in an automotive edge computing environment 200, in accordance with an illustrative embodiment of the invention. Method 900 will be discussed from the perspective of the service maintenance system 170 in FIG. 8. While method 900 is discussed in combination with service maintenance system 170, it should be appreciated that method 900 is not limited to being implemented within service maintenance system 170, but service maintenance system 170 is instead one example of a system that may implement method 900.

At block 910, resource and status tracking module 815 computes a first estimation result (e.g., E1 discussed above) pertaining to computation resources of a current edge server 222 with which a vehicle 100 is in communication to conduct a service session. As discussed above in connection with the server resource estimator 322 in FIG. 4, in some embodiments, resource and status tracking module 815 computes the first estimation result, at least in part, using a ML model (e.g., ML Model II discussed above).

At block 920, resource and status tracking module 815 computes a second estimation result (e.g., E2 discussed above) pertaining to link quality of a communication link between the vehicle 100 and the current edge server 222. As discussed above in connection with link quality estimator 324 in FIG. 4, in some embodiment's the second estimation result is computed based on principles such as Shannon's Theorem.

At block 930, resource and status tracking module 815 computes a third estimation result (e.g., E3 discussed above) pertaining to the service quality associated with the service session. As discussed above in connection with the service quality estimator 326 in FIG. 4, in some embodiments, resource and status tracking module 815 computes the third estimation result, at least in part, using a ML model (e.g., ML Model III discussed above).

At block 940, triggering module 820 compares the first estimation result, the second estimation result, and the third estimation result with a first predetermined threshold, a second predetermined threshold, and a third predetermined threshold, respectively, as explained above. As also explained above, a predetermined threshold (e.g., th1, th2, or th3) is "triggered" when the associated estimation result (E1, E2, or E3, respectively) meets a predetermined condition relative to the applicable threshold (e.g., such as being greater than or less than the threshold).

At block 950, triggering module 820 selects a new edge server 222 with which to maintain the service session and initiates a service migration request (e.g., by transmitting a communication from the vehicle 100 to the new edge server 222), when the first predetermined threshold is triggered.

At block 960, triggering module 820 initiates a wireless access handover request to switch the communication link from a current base station 235 to a new base station 235, when only the second predetermined threshold is triggered. As discussed above, in this case the vehicle 100 can remain in communication with the current edge server 222 involved in the service session despite a wireless access handover from one base station 235 to another.

At block 970, triggering module 820 selects a new edge server with which to maintain the service session and initiates a service migration request (e.g., by transmitting a communication from the vehicle 100 to the new edge server 222), when only the third predetermined threshold is triggered and one of the following occurs: (1) a request for additional computation resources from the current edge server 222 is unsuccessful or (2) the service cost for the current edge server 222 exceeds a predetermined amount (e.g., a specified budget).

As discussed above, in some embodiments, when a service migration has been initiated (e.g., when Trigger Decision I is in effect), triggering module 820 selects the new edge server 222, at least in part, using a ML model (e.g., Personalized ML Model I 318 discussed above). As discussed above, the Personalized ML Model I 318 can be trained (e.g., at a cloud server 215) based on historical driving data (e.g., route information, driving behavior, service/application preferences, and trigger scenarios) associated with a particular vehicle 100 and its driver(s)/operator(s).

In some embodiments, method 900 includes additional actions that are not shown in FIG. 9. For example, in some embodiments, tracking window controller module 825 dynamically adjusts how often the first estimation result, the second estimation result, and the third estimation result are computed and compared, respectively, with the first predetermined threshold, the second predetermined threshold, and the third predetermined threshold, as discussed above. Also, in some embodiments, triggering module 820 receives (periodically or as needed), at the vehicle 100, the first predetermined threshold, the second predetermined threshold, and the third predetermined threshold from a cloud server 215 after the first predetermined threshold, the second predetermined threshold, and the third predetermined threshold have been optimized and updated by the cloud server 215.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/or orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-9, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for maintaining a service session in an automotive edge computing environment, the system comprising:
   a processor; and
   a memory storing computer-readable instructions that, when executed by the processor, cause the processor to:

compute a first estimation result concerning computation resources of a current edge server with which a vehicle is in communication to conduct a service session;
compute a second estimation result concerning link quality of a communication link between the vehicle and the current edge server;
compute a third estimation result concerning service quality of the service session;
receive at the vehicle from a cloud server first, second, and third predetermined thresholds that have been optimized and updated by the cloud server;
compare the first, second, and third estimation results with the first, second, and third predetermined thresholds, respectively;
select a new edge server with which to maintain the service session and initiate a service migration request, when the first predetermined threshold is triggered;
initiate a wireless access handover request, when only the second predetermined threshold is triggered; and
select a new edge server with which to maintain the service session and initiate a service migration request, when only the third predetermined threshold is triggered and one of an unsuccessful request for additional computation resources from the current edge server and a service cost for the current edge server above a predetermined amount occurs.

2. The system of claim 1, wherein the instructions to select the new edge server include instructions that, when executed by the processor, cause the processor to select the new edge server, at least in part, using a machine-learning model.

3. The system of claim 2, wherein the machine-learning model is personalized for the vehicle based on historical driving data associated with the vehicle.

4. The system of claim 1, wherein the instructions to compute the first estimation result include instructions that, when executed by the processor, cause the processor to compute the first estimation result, at least in part, using a machine-learning model.

5. The system of claim 1, wherein the instructions to compute the third estimation result include instructions that, when executed by the processor, cause the processor to compute the third estimation result, at least in part, using a machine-learning model.

6. The system of claim 1, wherein the computer-readable instructions include further instructions that, when executed by the processor, cause the processor to adjust dynamically how often the first, second, and third estimation results are computed and compared, respectively, with the first, second, and third predetermined thresholds.

7. A non-transitory computer-readable medium for maintaining a service session in an automotive edge computing environment and storing instructions that, when executed by a processor, cause the processor to:
compute a first estimation result concerning computation resources of a current edge server with which a vehicle is in communication to conduct a service session;
compute a second estimation result concerning link quality of a communication link between the vehicle and the current edge server;
compute a third estimation result concerning service quality of the service session;
receive at the vehicle from a cloud server first, second, and third predetermined thresholds that have been optimized and updated by the cloud server;
compare the first, second, and third estimation results with the first, second, and third predetermined thresholds, respectively;
select a new edge server with which to maintain the service session and initiate a service migration request, when the first predetermined threshold is triggered;
initiate a wireless access handover request, when only the second predetermined threshold is triggered; and
select a new edge server with which to maintain the service session and initiate a service migration request, when only the third predetermined threshold is triggered and one of an unsuccessful request for additional computation resources from the current edge server and a service cost for the current edge server above a predetermined amount occurs.

8. The non-transitory computer-readable medium of claim 7, wherein the instructions include instructions that, when executed by the processor, cause the processor to select the new edge server, at least in part, using a machine-learning model.

9. The non-transitory computer-readable medium of claim 8, wherein the machine-learning model is personalized for the vehicle based on historical driving data associated with the vehicle.

10. The non-transitory computer-readable medium of claim 7, wherein the instructions include instructions that, when executed by the processor, cause the processor to compute the first estimation result, at least in part, using a machine-learning model.

11. The non-transitory computer-readable medium of claim 7, wherein the instructions include instructions that, when executed by the processor, cause the processor to compute the third estimation result, at least in part, using a machine-learning model.

12. The non-transitory computer-readable medium of claim 7, wherein the computer-readable instructions include further instructions that, when executed by the processor, cause the processor to adjust dynamically how often the first, second, and third estimation results are computed and compared, respectively, with the first, second, and third predetermined thresholds.

13. A method, comprising:
computing a first estimation result concerning computation resources of a current edge server with which a vehicle is in communication to conduct a service session;
computing a second estimation result concerning link quality of a communication link between the vehicle and the current edge server;
computing a third estimation result concerning service quality of the service session;
receiving at the vehicle from a cloud server first, second, and third predetermined thresholds that have been optimized and updated by the cloud server;
comparing the first, second, and third estimation results with the first, second, and third predetermined thresholds, respectively;
selecting a new edge server with which to maintain the service session and initiating a service migration request, when the first predetermined threshold is triggered;
initiating a wireless access handover request, when only the second predetermined threshold is triggered; and
selecting a new edge server with which to maintain the service session and initiating a service migration request, when only the third predetermined threshold is triggered and one of an unsuccessful request for additional computation resources from the current edge server and a service cost for the current edge server above a predetermined amount occurs.

14. The method of claim 13, wherein the selecting a new edge server is performed, at least in part, by a machine-learning model.

15. The method of claim 14, wherein the machine-learning model is personalized for the vehicle based on historical driving data associated with the vehicle.

16. The method of claim 13, wherein the computing the first estimation result is performed, at least in part, by a machine-learning model.

17. The method of claim 13, wherein the computing the third estimation result is performed, at least in part, by a machine-learning model.

18. The method of claim 13, further comprising dynamically adjusting how often the first, second, and third estimation results are computed and compared, respectively, with the first, second, and third predetermined thresholds.

* * * * *